United States Patent [19]

Shimamune et al.

[11] Patent Number: 5,407,550
[45] Date of Patent: Apr. 18, 1995

[54] ELECTRODE STRUCTURE FOR OZONE PRODUCTION AND PROCESS FOR PRODUCING THE SAME

[75] Inventors: Takayuki Shimamune, Tokyo; Isao Sawamoto, Kanagawa, both of Japan

[73] Assignee: Permelec Electrode Ltd., Kanagawa, Japan

[21] Appl. No.: 275,665

[22] Filed: Jul. 15, 1994

Related U.S. Application Data

[63] Continuation of Ser. No. 738,639, Jul. 31, 1991, abandoned.

[30] Foreign Application Priority Data

Aug. 1, 1990 [JP] Japan ................... 2-202484

[51] Int. Cl.⁶ .................. C25B 9/00; C25B 11/03; C25B 11/04; B05D 5/12
[52] U.S. Cl. ...................... 204/283; 204/290 F; 427/126.3; 427/245
[58] Field of Search .............. 204/283, 290 F; 427/77, 427/126.3, 226, 327, 419.3, 245, 419.2; 428/469, 701, 422

[56] References Cited

U.S. PATENT DOCUMENTS

| | | | |
|---|---|---|---|
| 4,822,459 | 4/1989 | Ueda et al. | 204/290 F |
| 4,927,800 | 5/1990 | Nishiki et al. | 204/290 R |
| 4,935,110 | 6/1990 | Nishiki et al. | 204/290 R |

*Primary Examiner*—Kathryn Gorgos
*Attorney, Agent, or Firm*—Sughrue, Mion, Zinn, Macpeak & Seas

[57] ABSTRACT

Disclosed is an electrode structure for ozone production which comprises a perfluorocarbon sulfonic acid-based ion-exchange membrane as a solid electrolyte and an anode placed on one side of the solid electrolyte and having a lead oxide as an electrode catalyst, wherein a porous, perfluorocarbon sulfonic acid-based ion-exchange resin layer is formed between the electrolyte and the anode. A process for producing the electrode structure for ozone production is also disclosed, which comprises coating one side of a perfluorocarbon sulfonic acid-based ion-exchange membrane as a solid electrolyte with a liquid, perfluorocarbon sulfonic acid-based ion-exchange resin or with a suspension of ion-exchange resin powder, heating-treating the liquid or suspension-formed ion-exchange resin coating to form an ion-exchange resin layer, and then positioning an anode so as to keep it in close contact with the ion-exchange resin layer, the anode having a lead oxide as an electrode catalyst.

11 Claims, No Drawings

5,407,550

ELECTRODE STRUCTURE FOR OZONE PRODUCTION AND PROCESS FOR PRODUCING THE SAME

This is a Continuation of application Ser. No. 07/738,639 filed Jul. 31, 1991, now abandoned.

FIELD OF THE INVENTION

The present invention relates to an electrolytic cell structure having a lead oxide electrode, and a process for producing the cell structure. More particularly, the present invention relates to an electrolytic cell structure for producing ozone gas or ozone-containing water for use in the disinfection of water, cleaning, and other applications, and a process for producing the cell structure.

BACKGROUND OF THE INVENTION

Electrolysis of water to obtain hydrogen and oxygen (and ozone) has conventionally been conducted extensively. For example, ozone for sterilization and other uses and other substances have been produced using an electrolytic cell equipped with a diaphragm and using an aqueous solution of caustic potash as the electrolyte.

In the production of ozone by the electrolysis of water, attention is focused on how to reduce the power unit or lower the production cost of the electrodes in order to conduct electrolysis efficiently. Recently, an electrolytic process using a solid electrolyte has been employed in which an ion-exchange membrane of the sulfonic group-containing fluoroplastic type, for example, is used as a diaphragm. The diaphragm is first coated on one side with an active anode material and is coated on the other side with an active cathode material, and thereafter, electrolysis is performed with the ion-exchange membrane as the solid electrolyte while water is fed from the anode side. In this electrolytic process, in which electrolysis is generally conducted with the electrodes being close to or in close contact with the diaphragm, the sulfonic groups and fluorine compound (fluoroplastic) in the diaphragm function as co-catalysts for ozone evolution. Therefore, only those parts of the electrode material (e.g., lead dioxide) which are located near the sulfonic groups, i.e., close to the ion-exchange membrane, greatly contribute to ozone evolution.

This does not cause any particular problems if the electrolyte is sufficiently pure, i.e., having an electrical conductivity of about 1 $\mu$S/cm or less, provided that the parts of the electrode material other than those in direct contact with the ion-exchange membrane are insulated and, hence, do not contribute to electrolysis. In this case, the electrode material is utilized only partly, and the electrode production cost, which is relatively high, cannot be reduced. In practice, however, electrolysis also takes place on the parts of the electrode which are not in direct contact with the ion-exchange membrane, because the electrical conductivity of the electrolyte in contact with or close to the ion-exchange membrane usually increases to 10 $\mu$S/cm or more due to carbonic acid gas present in the electrolyte and substances dissolved out from the electrode. Since electrolysis on those parts of the electrode material proceeds in the absence of a co-catalyst, a problem occurs in that such electrolysis of water results mainly in the evolution of oxygen, thus lowering the ozone-evolving efficiency and current efficiency for the whole electrolytic process.

JP-A-63-100190 (the term "JP-A" as used herein means an "unexamined published Japanese patent application"), for example, discloses an electrode structure in which the anode is a two-layer structure and contains an electrode material only in the layer in contact with an ion-exchange membrane (solid electrolyte), to improve electric current efficiency. However, since such an electrode structure has a limited practical electrode area, the current density is increased, resulting in a possible shortening of the electrode life. In addition, there is another problem in that the electrolytic cell necessarily has a complicated structure.

SUMMARY OF THE INVENTION

Accordingly, an object of the present invention is to provide an electrode structure for ozone production, which can maintain electric current efficiency of ozone evolution substantially constant without reducing the effective electrode area.

Another object of the present invention is to provide a process for producing the above electrode structure.

The electrode structure for ozone production according to the present invention comprises a perfluorocarbon sulfonic acid-based ion-exchange membrane as a solid electrolyte and an anode placed on one side of the solid electrolyte and having a lead oxide as an electrode catalyst, wherein a porous, perfluorocarbon sulfonic acid-based ion-exchange resin layer is formed between the solid electrolyte and the anode.

The process for producing the electrode structure for ozone production according to the present invention comprises coating one side of a perfluorocarbon sulfonic acid-based ion-exchange membrane as a solid electrolyte with a liquid, perfluorocarbon sulfonic acid-based ion-exchange resin or with a suspension of the ion-exchange resin powder, heat-treating the liquid or suspension-form ion-exchange resin coating to form an ion-exchange resin layer, and then positioning an anode so as to keep it in close contact with the ion-exchange resin layer, the anode having a lead oxide as an electrode catalyst.

DETAILED DESCRIPTION OF THE INVENTION

The electrode structure for ozone production according to the present invention, which uses a solid electrolyte and a lead dioxide anode, has a porous ion-exchange resin layer between the solid electrolyte and anode in order that a large number of sulfonic groups and fluorine atoms which function as co-catalysts are present around the lead dioxide anode. To ensure contact between an ion-exchange membrane as a solid electrolyte and an ozone-evolving anode covered with an electrode material such as a lead oxide or the like to attain highly efficient ozone evolution, a technique of pressing the anode against the ion-exchange membrane at high pressure to position it in the membrane is occasionally employed. However, this technique is disadvantageous in that because of the very high pressure applied, the technique is not practical for the production of large-area electrolytic cells.

This disadvantage for large-area electrolytic cells is attributable to the fact that under ordinary pressure, the anode in a porous form or in the form of a rod, flat plate, or the like cannot be brought into contact in a sufficiently large area with the ion-exchange membrane having a smooth surface. As a result, the sulfonic groups and fluorine atoms present in the ion-exchange membrane cannot fully function as co-catalysts.

By contrast, in the present invention, a porous layer of an ion-exchange resin having sulfonic groups and fluorine atoms is formed between the ion-exchange membrane and the lead oxide anode, so that the porous ion-exchange resin layer can be in contact with the anode in a sufficiently large area. Therefore, a sufficiently large number of sulfonic groups and fluorine atoms in the ion-exchange resin layer can be present around the lead oxide as the electrode material of the anode without having to apply high pressure. These sulfonic groups and fluorine atoms function as co-catalysts to improve the ozone-evolving efficiency, inhibit the electrolytic reaction which proceeds in the absence of a catalyst, i.e., the oxygen-evolving reaction, to a considerable degree, and permit uniformity in current density.

The substrate of the anode used in the present invention is not particularly limited in shape, provided that the ion-exchange resin layer can be in close contact with both the solid electrolyte (ion-exchange membrane) and the anode to allow an electric current to pass through uniformly, and the oxygen gas and ozone gas evolving on the anode can be removed from the back side of the anode. However, it is generally desirable that the substrate is a porous material having fine through-holes having a large enough diameter to satisfactorily conduct degassing. The diameter is usually about 50 to 300 $\mu$m.

Most preferably, the anode substrate is a corrosion-resistant porous metal substrate comprising a valve metal such as titanium or tantalum, an alloy of such a valve metal, a ceramic such as sintered titanium oxide or sintered carbon, or the like, and a thin layer of lead dioxide is formed on the surface of the substrate to produce a lead dioxide anode.

On the above-described substrate, a lead oxide electrode catalyst is preferably formed by electrodeposition through an intermediate layer which serves to maintain the electrical conductivity even during anodic polarization. Although this intermediate layer may be a substance, such as platinum or the like, which has electrical conductivity and can be an electrode catalyst, it is desirable that the intermediate layer be formed from a substance which has electrical conductivity but does not function or only slightly functions as an electrode catalyst. This is desirable because if an intermediate layer made of platinum or the like is exposed, an electrolytic reaction takes place with the exposed intermediate layer itself as the electrode catalyst, resulting in reduced electric current efficiency of ozone evolution. An example of the substance which can be used to form the intermediate layer is a material obtained by dispersing platinum into a composite oxide of titanium and tantalum, the molar ratio of the platinum to the oxide being about $\frac{1}{4}$.

Use of tantalum in the anode substrate is particularly advantageous for attaining highly efficient ozone evolution, because electric current can be passed from the substrate consisting of tantalum to the lead dioxide layer without an intermediate layer. Although the reason for this has not been discovered, where the substrate consists of tantalum only, it causes no electrolysis. In this case, however, it is desirable that an $\alpha$-lead dioxide layer is first formed by electrodeposition from a caustic soda solution of a lead oxide, and a $\beta$-lead dioxide layer be then formed on the surface of the $\alpha$-lead dioxide layer. The thus-obtained electrode can stably evolve ozone at high electric current efficiency.

The substrate may be used as it is to cover an intermediate layer or a lead dioxide layer. However, the intermediate layer or lead dioxide layer can be adhered strongly to the substrate by subjecting the substrate to pretreatment before attachment to activate the substrate surface. This pretreatment can be performed, for example, by a blasting treatment in which the surface is roughened and increased in surface area, pickling for activating the surface, or an electrolytic treatment in which cathodic polarization is conducted in an electrolyte such as aqueous sulfuric acid solution or the like to evolve hydrogen gas from the substrate surface. In the electrolytic treatment, the surface is cleaned and, at the same time, activated by hydrogenated products formed from part of the hydrogen gas.

The electrode substrate on which an intermediate layer has been thus formed or not been formed is then covered with a lead dioxide layer. The $\alpha$- and $\beta$-lead dioxides can be used as electrically conductive lead oxides, and both can be easily electrodeposited to provide stable layers. However, use of $\beta$-lead dioxide, in particular, tends to result in a high electric current efficiency of ozone evolution and is hence preferred. It is desirable that in order to form such a $\beta$-lead dioxide layer uniformly over the whole surface of the substrate, the surface is first covered with an $\alpha$-lead dioxide layer, which is then covered with a $\beta$-lead dioxide layer.

Formation of an $\alpha$-lead dioxide layer over the electrode substrate may be accomplished by an electrolytic technique in which the substrate is used as the anode, and a solution prepared by dissolving, to saturation, lead oxide (PbO) into an aqueous sodium hydroxide solution having a concentration of about 25% is used as the electrolyte. Electrolysis is conducted at 25° to 60° C. at a relatively low electric current density of about 1 to 2 A/dm$^2$, thereby electrodepositing the desired layer. The thickness of this $\alpha$-lead dioxide layer is in the range which permits the layer to cover the whole surface. The most preferred thickness ranges from about 5 to 100 $\mu$m.

Formation of a $\beta$-lead dioxide layer over the $\alpha$-lead dioxide layer on the substrate may be accomplished by an electrolytic technique in which the substrate to be covered is used as the anode, and an aqueous lead nitrate solution containing 200 to 400 g/l of lead, for example, is used as the electrolyte. Electrolysis is conducted at an electrolyte pH of 2 to 0, a temperature of 60° to 80° C., and an electric current density of 1 to 10 A/dm$^2$, thereby electrodepositing the desired layer. The thickness of the $\beta$-lead dioxide layer is generally from about 40 to 500 $\mu$m.

The ion-exchange membrane as a solid electrolyte is a conventional perfluorocarbon sulfonic acid-based ion-exchange membrane. Between this ion-exchange membrane and the above-described anode, an ion-exchange resin layer having a sulfonic group is formed. Methods for forming this ion-exchange resin layer are not particularly limited. For example, in a desirable method, a liquid ion-exchange resin or a suspension of an ion-exchange resin powder is coated on the surface of the above ion-exchange membrane, and the resulting coating on the membrane is heated with or without application of pressure, to bake the coating.

The amount of pressure applied is not especially limited, but about 1 to 50 atm is sufficient because it is preferred to make the thus-formed ion-exchange resin layer porous. The heating desirably is performed at a temperature slightly lower than the melting point of the ion-exchange resin. Specifically, the temperature is from 110° to 250° C., preferably from 175° to 200° C., although it varies depending on the pressure.

Since the apparent thickness of the lead dioxide layer on the anode can be controlled to be about 100 to 200 μm, the apparent thickness of the thus-formed porous, perfluorocarbon sulfonic acid- based ion-exchange resin layer can be as small as 200 μm or less.

The packing ratio of the porous ion-exchange resin layer is from 5 to 50%, and desirably from 10 to 30%. If the packing ratio exceeds 50%, the resin layer shows too high membrane resistance during electrolysis, causing the possibility of increases in voltage and temperature. If the packing ratio thereof is below 5%, there is the possibility that sufficient amounts of sulfonic groups and fluorine atoms might not be present around the lead dioxide in the anode. The packing ratio used herein means the reverse of porosity, i.e., the proportion of the resin in the porous ion-exchange resin layer.

It is desirable that the ion-exchange resin layer be positioned so as to enclose the lead dioxide layer of the anode, provided that this does not result in too high electrical resistance.

In the thus-produced electrode structure, the ion-exchange resin layer present between the ion-exchange membrane and the anode is porous. By application of only a small amount of pressure, the resin layer can be brought into close contact with the anode containing lead dioxide as an electrode material. Therefore, a large number of sulfonic groups and fluorine atoms, both of which are co-catalysts for ozone evolution, are present around the lead dioxide where ozone evolution takes place. For this reason, the electrolytic reaction to evolve ozone proceeds preferentially around the lead dioxide, and oxygen evolution is suppressed, thereby improving the ozone-evolving efficiency or the electric current efficiency of ozone evolution.

As described above, the electrode structure for ozone production according to the present invention is characterized in that a porous, perfluorocarbon sulfonic acid-based ion-exchange resin layer is formed between the perfluorocarbon sulfonic acid-based ion-exchange membrane as a solid electrolyte and the lead dioxide anode.

Since the ion-exchange resin layer in the electrode structure is porous unlike the ion-exchange membrane having a smooth surface, it can be brought into close contact with the anode by pressing it against the anode at a low pressure, and this close contact enables a large number of sulfonic groups and fluorine atoms which function as co-catalysts to be present during electrolysis around the lead dioxide as an electrode material to improve the selectivity for ozone evolution.

Therefore, even in the case of a large-sized electrolytic apparatus, it is possible to allow, by application of a relatively low pressure, a large number of sulfonic groups and fluorine atoms which function as co-catalysts to be present around the anode having a large surface area. Hence, the ozone-evolving reaction can proceed uniformly over almost the entire surface of the lead dioxide layer without reducing the effective electrode area and a high electric current efficiency of ozone evolution can be maintained, even if the electrolyte used has a high electrical conductivity.

As the anode substrate, tantalum or titanium can be used. In the case of using titanium, an electrically conductive intermediate layer is preferably formed between the substrate and the lead dioxide layer. Since the intermediate layer only weakly functions as an electrode catalyst but has high electrical conductivity, the electrode material can be prevented from being in the passive state, and a sufficient quantity of electric current can be passed through the anode without inhibiting the evolution of ozone on the lead dioxide layer.

Use of tantalum is advantageous, particularly for high-efficiency ozone evolution, because the substrate based on tantalum, even though tantalum belongs to the so-called valve metals like titanium, can allow electric current to pass directly to the lead dioxide layer without an intermediate layer.

The ion-exchange resin layer used in the electrode structure for ozone evolution according to the present invention should be porous as described above. This porous ion-exchange resin layer is formed, in the process according to the invention for producing the electrode structure, by coating one side of a perfluorocarbon sulfonic acid-based ion-exchange membrane as a solid electrolyte with a liquid perfluorocarbon sulfonic acid-based ion-exchange resin or with a suspension of a perfluorocarbon sulfonic acid-based ion-exchange resin powder, and then heat-treating the coating.

By the use of the electrode structure in which the ion-exchange resin layer is porous and which can be produced by the process of the present invention, electrolysis of water can be conducted with a large number of sulfonic groups and fluorine atoms which function as co-catalysts around the lead dioxide as an electrode material, because the ion-exchange resin layer is in close contact with the anode, which has been attained by application of only a low pressure. Therefore, ozone evolution can be conducted at a high electric current efficiency.

The present invention will be explained by reference to the following examples, which should not be construed as limiting the scope of the invention.

EXAMPLE 1

Perfluorocarbon sulfonic acid-based ion-exchange membrane (Nafion 117, manufactured by E. I. du Pont de Nemours and Co., U.S.A.) was used as a solid electrolyte. This membrane was coated on one side with a suspension of Nafion Powder (trade name of an ion-exchange resin powder), and the coating was heated for 30 minutes at a temperature of 180° to 200° C. while applying a pressure of 5 kg/cm$^2$, thereby forming a porous ion-exchange resin layer. The apparent thickness of this ion-exchange resin layer was 100 μm.

On the resulting ion-exchange membrane, a film of ruthenium metal was formed on the side opposite to the porous layer side by electroless plating, thereby producing a cathode.

A coating liquid containing tantalum (75%) and platinum (25%) was applied on the surface of a planar substrate obtained by loose sintering of a titanium powder. Through pyrolysis of the coating applied, an intermediate layer of a platinum/tantalum oxide was formed on the substrate surface.

An 800 g/l aqueous solution of lead nitrate, as an electrolyte, was heated to 70° C. after a small amount of nitric acid was added thereto. The above-described substrate and a titanium plate were immersed in the heated electrolyte, and preliminary electrolysis was first conducted at an electric current density of 10 A/dm$^2$, and then electrolysis was conducted at an electric current density of 4 A/dm$^2$, thereby electrodepositing a β-lead dioxide layer on the substrate surface to produce an anode. The apparent thickness of this lead dioxide layer was about 100 μm.

This anode having the electrodeposited lead dioxide layer was pressed against the above-described ion-exchange membrane on the ion-exchange resin layer side at a pressure of 1.0 kg/cm$^2$, thereby forming an electrode structure. This electrode structure was installed in an electrolytic cell and ion-exchanged water having an electrical conductivity of 10 μS/cm was introduced into the cell. Electrolysis was then conducted at an electric current density of 100 A/dm$^2$. As a result, the cell voltage was 3.1 V and the ozone-evolving efficiency was 15.5%. The ozone-evolving efficiency used herein means the amount (wt. %) of ozone in the gas evolved.

COMPARATIVE EXAMPLE

An electrode structure was prepared and installed in an electrolytic cell in the same manner as in Example 1 except that the formation of a porous ion-exchange resin layer on one side of the ion-exchange membrane was omitted. Ion-exchanged water having an electrical conductivity of 10 μS/cm was then electrolyzed for ozone evolution under the same electrolysis conditions as in Example 1. As a result, the cell voltage was 3.1 V, which was the same as that in Example 1, but the ozone-evolving efficiency was 13.5% which was considerably lower than the 15.5% in Example 1. It can be seen from the above that ozone-evolving efficiency is improved by the presence of the porous ion-exchange resin layer.

EXAMPLE 2

A porous substrate obtained by compacting tantalum filaments and sintering the compact was cleaned with hydrofluoric acid. Using an aqueous solution prepared by dissolving, to saturation, lead monoxide (PbO) into a 30% caustic soda solution as an electrolyte and also using the above substrate as an electrode, electrolysis was then conducted at 40° C. and 1 A/dm$^2$ for 10 minutes, thereby forming an α-lead dioxide layer on the surface of the substrate. Further, a β-lead dioxide layer was formed on the surface of the resulting substrate by electrodeposition under the same conditions as in Example 1, thereby forming an anode.

Using this anode and the same ion-exchange membrane (having an ion-exchange resin layer and cathode formed thereon) as used in Example 1, an electrolytic cell was constructed in the same manner as in Example 1. Ion-exchanged water having an electrical conductivity of 100 μS/cm was introduced into the electrolytic cell and electrolysis was then conducted at an electric current density of 120 A/dm$^2$. As a result, the cell voltage was 3.3 V, and the electric current efficiency was 14.5%. Further, even after a continuous 1,000 hour run of the electrolytic cell, no change was observed on the anode side.

While the invention has been described in detail and with reference to specific embodiments thereof, it will be apparent to one skilled in the art that various changes and modifications can be made therein without departing from the spirit and scope thereof.

What is claimed is:

1. An electrode structure for ozone production consisting essentially of a perfluorocarbon sulfonic acid ion-exchange membrane as a solid electrolyte and an anode placed on one side of the solid electrolyte and having a lead oxide as an electrode catalyst, wherein only a porous, perfluorocarbon sulfonic acid ion-exchange resin layer is formed between said solid electrolyte and said anode.

2. An electrode structure as in claim 1, wherein said anode is formed by first covering a tantalum or tantalum-alloy substrate with an α-lead dioxide layer, and then covering said α-lead dioxide layer with a β-lead dioxide layer.

3. An electrode structure as in claim 2, wherein said α-lead dioxide layer has a thickness of from 5 to 100 μm.

4. An electrode structure as in claim 1, wherein said anode is formed by covering a titanium or titanium-alloy substrate with an electrically conductive intermediate layer and then covering said intermediate layer with an electrodeposited lead dioxide layer.

5. An electrode structure as in claim 1, wherein said anode comprises a porous substrate having fine through-holes having a diameter of from 5 to 300 μm.

6. An electrode structure as in claim 1, wherein said porous, perfluorocarbon sulfonic acid ion-exchange resin layer has a packing ratio of from 5 to 50%.

7. An electrode structure as in claim 1, wherein said porous, perfluorocarbon sulfonic acid-based ion-exchange resin layer has a packing ratio of from 10 to 30%.

8. A process for producing an electrode structure for ozone production which comprises coating one side of a perfluorocarbon sulfonic acid ion-exchange membrane as a solid electrolyte with only a liquid, perfluorocarbon sulfonic acid ion-exchange resin, heat-treating the liquid ion-exchange resin coating to form an ion-exchange resin layer, and then positioning an anode to keep it in close contact with the ion-exchange resin layer, said anode having a lead oxide as an electrode catalyst.

9. A process for producing an electrode structure as in claim 8, wherein said heat-treating is carried out at a temperature of from 110° to 250° C.

10. A process for producing an electrode structure as in claim 8, wherein said heat-treating is carried out at a temperature of from 175° to 200° C.

11. A process for producing an electrode structure for ozone production which comprises coating one side of a perfluorocarbon sulfonic acid ion-exchange membrane as a solid electrolyte with only a suspension of a perfluorocarbon sulfonic acid ion-exchange resin powder, heat-treating the suspension coating to form an ion-exchange resin layer, and then positioning an anode to keep it in close contact with the ion-exchange resin layer, said anode having a lead oxide as an electrode catalyst.

* * * * *